(12) United States Patent
Cha et al.

(10) Patent No.: US 11,646,422 B2
(45) Date of Patent: May 9, 2023

(54) NEGATIVE ELECTRODE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Inoh Cha, Yongin-si (KR); Deok-Hyun Kim, Yongin-si (KR); Jinhee Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/930,676

(22) Filed: Sep. 8, 2022

(65) Prior Publication Data
US 2023/0006212 A1    Jan. 5, 2023

Related U.S. Application Data

(63) Continuation of application No. 16/753,319, filed as application No. PCT/KR2018/009850 on Aug. 27, 2018, now Pat. No. 11,444,283.

(30) Foreign Application Priority Data

Nov. 7, 2017    (KR) .......................... 10-2017-0147446

(51) Int. Cl.
*H01M 4/36*    (2006.01)
*H01M 4/66*    (2006.01)
(Continued)

(52) U.S. Cl.
CPC ........... *H01M 4/661* (2013.01); *H01M 4/366* (2013.01); *H01M 4/623* (2013.01);
(Continued)

(58) Field of Classification Search
None
See application file for complete search history.

(56) References Cited

U.S. PATENT DOCUMENTS

2013/0224584 A1    8/2013    Sung et al.
2014/0057170 A1    2/2014    Cha et al.
(Continued)

FOREIGN PATENT DOCUMENTS

| CN | 102683637 A | 9/2012 |
|---|---|---|
| CN | 103066250 A | 4/2013 |

(Continued)

OTHER PUBLICATIONS

Machine translation of KR20170111743 (Year: 2017).*
(Continued)

*Primary Examiner* — Wyatt P McConnell
(74) *Attorney, Agent, or Firm* — Lewis Roca Rothgerber Christie LLP

(57) ABSTRACT

The present invention relates to a negative electrode for a lithium secondary battery and a lithium secondary battery comprising the same. The negative electrode for a lithium secondary battery comprises a current collector and a negative electrode active material layer formed on the current collector, wherein the negative electrode active material layer includes a first negative electrode active material and a first binder, and a second active material layer formed on the first active material layer and including a second negative electrode active material and a second binder, a content of the first binder is greater than that of the second binder, a loading level of the negative electrode active material layer is 10 mg/cm² to 30 mg/cm², a loading level of the first active material layer is 4 mg/cm² to 25 mg/cm², a loading level of the second active material layer is 4 mg/cm² to 25 mg/cm², (Continued)

and a loading level of the second active material layer is equal to or higher than that of the first active material layer.

12 Claims, 4 Drawing Sheets

(51) Int. Cl.
   *H01M 4/62* (2006.01)
   *H01M 10/0525* (2010.01)
   *H01M 4/02* (2006.01)

(52) U.S. Cl.
   CPC .. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2014/0287316 A1 | 9/2014 | Ahn et al. |
| 2017/0005335 A1 | 1/2017 | Ko |
| 2017/0133681 A1 | 5/2017 | Ko et al. |
| 2018/0006291 A1 | 1/2018 | Kim et al. |

FOREIGN PATENT DOCUMENTS

| | | | |
|---|---|---|---|
| CN | 104126242 A | | 10/2014 |
| CN | 106328885 A | | 1/2017 |
| CN | 106450169 A | | 2/2017 |
| CN | 106848190 A | | 6/2017 |
| JP | 2014-35886 A | | 2/2014 |
| JP | 2015-511389 A | | 4/2015 |
| JP | 2015511389 | * | 4/2015 |
| KR | 10-2012-0124077 A | | 11/2012 |
| KR | 10-2014-0026856 A | | 3/2014 |
| KR | 10-2014-0095980 A | | 8/2014 |
| KR | 10-2014-0137660 A | | 12/2014 |
| KR | 10-2015-0071453 A | | 6/2015 |
| KR | 10-2016-0040830 A | | 4/2016 |
| KR | 10-2016-0111673 A | | 9/2016 |
| KR | 10-1783445 B1 | | 9/2017 |
| KR | 10-2017-0111743 A | | 10/2017 |
| KR | 20170111743 | * | 10/2017 |
| WO | WO 2012/150813 A2 | | 11/2012 |

OTHER PUBLICATIONS

Machine translation of JP2015511389 (Year: 2015).*
EPO Extended European Search Report dated Aug. 5, 2021, issued in corresponding European Patent Application No. 18877099.4 (8 pages).
Chinese Office Action, with English translation, dated Oct. 8, 2022, issued in corresponding Chinese Patent Application No. 201880070675.X (21 pages).
U.S. Office Action dated Dec. 20, 2022, issued in U.S. Appl. No. 17/930,714 (8 pages).
U.S. Office Action dated Dec. 20, 2022, issued in U.S. Appl. No. 17/930,715 (8 pages).
U.S. Notice of Allowance dated Mar. 22, 2023, issued in U.S. Appl. No. 17/930,714 (7 pages).

* cited by examiner

NEGATIVE ELECTRODE FOR LITHIUM SECONDARY BATTERY AND LITHIUM SECONDARY BATTERY COMPRISING SAME

CROSS-REFERENCE TO RELATED APPLICATIONS

This application is a continuation of U.S. patent application Ser. No. 16/753,319, filed Apr. 2, 2020, which is a National Phase Patent Application of International Patent Application Number PCT/KR2018/009850, filed on Aug. 27, 2018, which claims priority to and the benefit of Korean Patent Application No. 10-2017-0147446, filed Nov. 7, 2017, the entire content of all of which is incorporated herein by reference.

TECHNICAL FIELD

This relates to a negative electrode for a lithium secondary battery and a lithium secondary battery including the same.

BACKGROUND ART

A lithium secondary battery has recently drawn attention as a power source for small portable electronic devices, and the lithium secondary battery uses an organic electrolyte solution and thereby has twice or more as high a discharge voltage than a conventional battery using an alkali aqueous solution, and accordingly, has high energy density.

As for a positive electrode active material of a lithium secondary battery, a lithium-transition metal oxide having a structure capable of intercalating/deintercalating lithium ions, such as $LiCoO_2$, $LiMn_2O_4$, $LiNi_{1-x}Co_xO_2$ ($0<x<1$), and the like has been mainly used.

As for negative electrode active materials, various carbon-based materials capable of intercalating/deintercalating lithium ions such as artificial graphite, natural graphite, and hard carbon have been used, and recently, a non-carbon-based negative electrode active material such as a silicon-based or tin-based material has been researched in order to obtain high capacity.

DISCLOSURE

Technical Problem

An embodiment provides a negative electrode for a lithium secondary battery exhibiting excellent cycle-life characteristics.

Another embodiment provides a lithium secondary battery including the negative electrode.

Technical Solution

One embodiment provides a negative electrode for a lithium secondary battery including a current collector and a negative electrode active material layer formed on the current collector, wherein the negative electrode active material layer includes a first active material layer including a first negative electrode active material and a first binder, and a second active material layer formed on the first active material layer and including a second negative electrode active material and a second binder, wherein a content of the first binder is greater than that of the second binder, a loading level of the negative electrode active material layer is 10 mg/cm$^2$ to 30 mg/cm$^2$, a loading level of the first active material layer is 4 mg/cm$^2$ to 25 mg/cm$^2$, a loading level of the second active material layer is 4 mg/cm$^2$ to 25 mg/cm$^2$, and a loading level of the second active material layer is equal to or higher than that of a loading level of the first active material layer.

The content of the first binder may be 1 wt % to 10 wt % based on a total weight of the first active material layer.

The content of the second binder may be 0.5 wt % to 10 wt % based on the total weight of the second active material layer.

A ratio of the content of the second binder/the content of the first binder may be more than 0 and less than 1.

A ratio of the loading level of the first active material layer to the loading level of the second active material layer may be 1:1 to 1:7.

At least one of the first active material layer and the second active material layer may further include a conductive material.

A conductive layer may be further included between the first active material layer and the second active material layer.

The first binder and the second binder may respectively be a non-aqueous binder or an aqueous binder. According to one embodiment, at least one of the first binder and the second binder may be an aqueous binder.

A pellet density of the first active material may be 1.1 g/cc to 2.0 g/cc. Furthermore, a pellet density of the second active material may be 1.1 g/cc to 2.0 g/cc.

The pellet density of the second active material may smaller than the pellet density of the first active material by 0.01 g/cc to 0.5 g/cc.

Another embodiment includes: a negative electrode; a positive electrode; and an electrolyte.

The exemplary matters of other embodiments of the present invention are included in the following detailed description.

Advantageous Effects

A negative electrode of a lithium secondary battery according to one embodiment may provide a lithium secondary battery exhibiting excellent output characteristics.

MODE FOR INVENTION

Hereinafter, embodiments are described in detail. However, these embodiments are exemplary, and the present invention is not limited thereto and is defined as the scope of the following claims.

A negative electrode of a lithium secondary battery of the present invention provides a negative electrode of a lithium secondary battery including a current collector and a negative electrode active material layer formed on the current collector, wherein the negative electrode active material layer includes a first negative electrode active material layer including a first negative electrode active material and a first binder and a second active material layer formed on the first active material layer and including a second negative electrode active material and a second binder.

Figure 1:
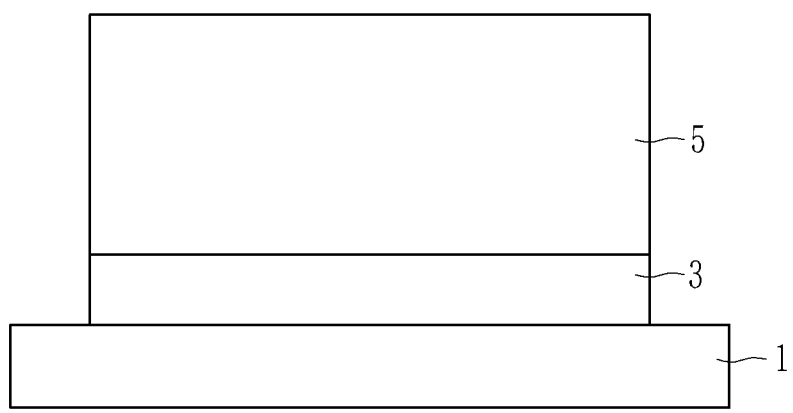
FIG. 1 is cross-sectional view showing a structure of an electrode according to one embodiment.

As shown in FIG. 1, a schematic structure of the negative electrode according to one embodiment may include a current collector 1, a first active material layer 3 formed on the current collector, and a second active material layer 5 formed on the first active material layer. That is, the first active material layer is positioned in contact with the current collector, and the second active material layer is not in contact with the current collector and is positioned in contact with the first active material layer. Thus, when the current collector is referred to, the first active material layer may be a lower layer and the second active material layer may be an upper layer. If the active material layer is formed in a single layer, a migration phenomenon of the binder causes the binder to be mainly present on the surface of the electrode which is farther away from the current collector, and thus the resistance may be increased and the cycle-life may be also deteriorated. Furthermore, if the active material layer is formed in a single layer while the thickness of the active material layer is increased in order to increase capacity, pressing in the surface severely occurs rather than at the inner part of the negative electrode active material layer, and thus impregnability of the electrolyte is decreased and the movement of the lithium ions is reduced, thereby decreasing the charge efficiency and deteriorating the cycle-life characteristics. Otherwise, when the active material layer is formed in two layer, as shown in one embodiment of the present invention, the binder being mainly present on the surface of the electrode may be prevented, and the binder may be relatively positioned near the current collector, compared to a single active material layer, and thus it allows good adherence of the active material layer to the current collector, considering the total active material layer.

In one embodiment, the content of the first binder is greater than that of the second binder. That is, the content of the first binder included in the first active material layer which is the lower layer in contact with the current collector is greater than that of the second binder included in the second active material layer which is the upper layer not in contact with the current collector.

A total content of the first binder and the second binder in the total negative electrode active material layer, may be 0.56 wt % to 10 wt % based on the total weight of the negative electrode active material layer.

The content of the first binder may be 1 wt % to 10 wt %, or 1 wt % to 5 wt % based on the total weight of the first active material layer.

Furthermore, the content of the second binder may be 0.5 wt % to 10 wt %, or 0.5 wt % to 4 wt %, based on the total weight of the second active material layer.

As such, the content of the first binder included in the first active material layer is greater than that of the second binder included in the second active material layer, and the desired ratio may be the ratio of the content of the second binder/the first binder of more than 0 and less than 1. Herein, the content of the first binder and the content of the second binder respectively indicate a value calculated by converting the amount of the active material included in each of the active material to 100 wt %. As shown above, when the content of the first binder included in the first active material layer is greater than that of the second binder in the second active material layer, the adherence of the first active material layer directly in contact with the current collector may be increased, and thus the stability of the battery may be improved. Furthermore, as the content of the second binder included in the second active material layer is smaller than that of the first binder included in the first active material layer, the electrical conductivity is high and pores in the active material layer may be maintained, and thus impregnability of the electrolyte may be increased and tortuosity may be remedied, thereby more freely moving lithium ions and improving the battery performance. If the content of the first binder included in the first active material layer is smaller than that of the second binder included in the second active material layer, the adhesion to the current collector may be deteriorated and separation may occur during charging and discharging.

A loading level of the negative electrode active material layer may be 10 mg/cm$^2$ to 30 mg/cm$^2$, a loading level of the first active material layer may be 4 mg/cm$^2$ to 25 mg/cm$^2$, a loading level of the second active material layer may be 4 mg/cm$^2$ to 25 mg/cm$^2$, and the loading level of the second active material layer may be equal to or more than the loading level of the first active material layer.

The first active material layer which is positioned in direct contact with the current collector and that may have good adherence strength acts to maintain the structural safety and the second active material layer which has lower resistance than that of the first active material, and acts to secure good battery characteristics, so that it is desirable that the loading levels of the second active material layer and the first active material layer are controlled to the loading level of the second active material layer being the same as or greater than that of the first active material layer.

According to one embodiment, the ratio of the loading level of the first active material layer and the loading level of the second active material layer may be 1:1 to 1:7. When the loading level of the first active material layer and the loading level of the second active material layer are within the above range, the merits from the formation of the first active material layer and the second active material layer may be effectively obtained and the separation of the first active material layer and the second active material layer is effectively prevented.

The first active material and the second active material may be a carbonaceous negative electrode active material, a Si-based negative electrode active material, or a combination thereof.

The carbonaceous negative electrode active material may be crystalline carbon, amorphous carbon, or a combination thereof. The crystalline carbon may be graphite such as with a non-specific shape, or sheet, flake, spherical, or fiber shaped natural graphite or artificial graphite. The amorphous carbon may be soft carbon, hard carbon, mesophase pitch carbide, fired cokes, or so on.

The Si-based negative electrode active material may be Si, SiO$_x$ (0<x<2), a Si-Q alloy (where Q is an element selected from an alkaline metal, an alkaline-earth metal, a group 13 element, a group 14 element, a group 15 element, a group 16 element, a transitional metal, a rare earth element, or a combination thereof, and is not Si), a Si-carbon composite, Sn, SnO$_2$, Sn—R (where R is an element selected from an alkaline metal, an alkaline-earth metal, a group 13 element, a group 14 element, a group 15 element, a group 16 element, a transition metal, a rare earth element, or a combination thereof, and is not Sn), a Sn-carbon composite, and the like, and may use a mixture of at least one of these materials with SiO$_2$. The elements Q and R may be one selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The first active material may be the same as or different from the second active material. Particularly, as the first active material and the second active material, it may be desired that the active material with higher pellet density may be used as the second active material, among the carbonaceous negative electrode active material having a pellet density of 1.1 g/cc to 2.0 g/cc. That is, the pellet density of the second active material is smaller than that of the first active material by 0.01 g/cc to 0.5 g/cc. As described above, when the active material having higher pellet density is used in the first active material layer and the active material having lower pellet density is used in the second active material layer, the first active material layer is more compressed during the pressing of the electrode preparation to increase the adhesion and the second active material is relatively less compressed to effectively produce pores and thus the electrolyte may be well impregnated.

The pellet density may be a powder pellet density or a slurry pellet density. The powder pellet density refers to a value measured from a pellet prepared using a negative electrode active material. The powder pellet preparation process may be performed by adding 0.5 g to 1.0 g of the negative electrode active material to a mold and maintaining it under a pressure of 1.0 tons to 2.0 tons for 20 seconds to 30 seconds.

The slurry pellet density refers to a value measured from a pellet prepared by mixing a negative electrode active material, binder, and optionally a conductive material to prepare a slurry, drying the slurry, pulverizing and pressing it. Herein, the pressurization may be performed by maintaining a pressure of 1.0 tons to 6.0 tons for 20 seconds to 30 seconds.

Furthermore, the average particle diameter (D50) of the first active material may be 5 μm to 25 μm, and the average particle diameter (D50) of the second active material may be 5 μm to 25 μm. Furthermore, it may be desired that the average particle diameter (D50) of the first active material is larger than the average particle diameter (D50) of the second active material, that is, the ratio of the average particle diameter (D50) of the first active material to the average particle diameter (D50) of the second active material (the average particle diameter (D50) of the first active material/the average particle diameter (D50) of the second active material) may be more than 1 and 4 or less. As such, when the average particle diameter D50 of the first active material is larger than the average particle diameter D50 of the second active material, the adherence to the current collector may be further improved and the contact resistance may be decreased, so that the battery performance may be improved.

In the specification, when a definition is not otherwise provided, an average particle diameter (D50) indicates a diameter of a particle where a cumulative volume is 50 volume % in a particle distribution.

The first binder and the second binder may respectively be a non-aqueous binder or an aqueous binder. According to one embodiment, at least one of the first binder and the second binder may be an aqueous binder. When at least one of the first binder and the second binder is the aqueous binder, the electrical conductivity may be improved, the tortuosity may be easily secured, and it may have the environmentally-friendly merit.

The non-aqueous binder may be polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber (SBR), acryl rubber, butyl rubber, fluorine rubber, ethylene propylene copolymer, polyepichlorohydrin, polyphosphazene, polyacrylonitrile, polystyrene, an ethylene propylene diene copolymer, poly(vinylpyridine), chlorosulfonated polyethylene, latex, a polyester resin, an acrylic resin, a phenolic resin, an epoxy resin, polyvinyl alcohol, polyacrylic acid, or a combination thereof.

When the aqueous binder is used as the first binder or the second binder, a cellulose-based compound may be further used to provide viscosity as a thickener. The cellulose-based compound may include one or more of carboxymethyl cellulose, hydroxypropyl methylcellulose, methyl cellulose, or alkali metal salts thereof. The alkali metals may be Na, K, or Li. The thickener may be included in an amount of 0.1 parts by weight to 3 parts by weight based on 100 parts by weight of the negative electrode active material.

At least one of the first active material layer and the second active material layer may further include a conductive material. The conductive material is included to provide electrode conductivity and any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

When the first active material layer and the second active material layer further include the conductive material, the amount of the conductive material may be 0.01 parts by weight to 7.0 parts by weight based on each of the active material layers.

A conductive layer may be further included between the first active material layer and the second active material layer. The conductive layer may include the above conductive material. A thickness of the conductive layer may be 0.01 μm to 20.0 μm. When the thickness is within the range, the separation between the first active material and the second active material layer may be suppressed, thereby improving the structural stability and suppressing swelling.

The conductive layer may further a thickener, or may further include a thickener and a binder. Furthermore, the conductive layer may further include an active material.

The conductive layer may be formed by using a conductive layer composition include a conductive material, a thickener, and a solvent. The conductive material is included to provide electrode conductivity and any electrically conductive material may be used as a conductive material unless it causes a chemical change, and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The thickener may be a cellulose-based compound and the cellulose-based compound may include one or more of carboxymethyl cellulose, hydroxypropyl methylcellulose, methyl cellulose, or alkali metal salts thereof.

The solvent may be water such as deionized water.

The conductive layer composition may further include a binder. The binder may be any general binder used in the negative electrode.

The conductive layer composition further includes a negative electrode active material. The negative electrode active material may be a carbonaceous negative electrode active material, a Si-based negative electrode active material, or a combination thereof.

In the conductive layer composition, the ratio of the conductive material and the thickener may be 50 wt % to 90 wt % and 50 wt % to 10 wt %, respectively. When the conductive layer composition further includes the binder, the ratio of the conductive material, the thickener, and the binder may be 50 wt % to 90 wt %, 5 wt % to 25 wt %, and more than 0 wt % and 25 wt % less, respectively. Furthermore, when the conductive layer composition further includes a negative electrode active material, the ratio of the negative electrode active material, the conductive material, and the thickener may be 55 wt % to 99 wt %, 0.5 wt % to 25 wt %, and 0.5 wt % to 20 wt %, respectively. In addition, when the conductive layer composition further includes the negative electrode active material and the binder, the ratio of the negative electrode active material, the conductive material, the thickener, and the binder may be 55 wt % to 90 wt %, 0.5 wt % to 25 wt %, 0.5 wt % to 15 wt %, and more than 0 wt % and 5 wt % or less, respectively.

In the conductive layer composition, a total solid may be 5 wt % to 65 wt %.

In case of further including the conductive layer between the first active material layer and the second active material layer, the conductive material may not be included the first active material layer and/or the second active material layer, or the conducive material may be included at a reduced amount. That is, in case of further including the conductive layer, the amount of the conductive material included in the first active material layer and/or the second active material layer may be 0.01 parts by weight to 6.9 parts by weight based on each of the active material layers. As such, the additional inclusion of the conductive layer allows a decrease in the amount of the conductive material, and thus the charge and discharge efficiency, capacity, and the like may be further improved.

The negative electrode may have an active mass density of 1.20 g/cc to 1.80 g/cc.

The current collector may be selected from a copper foil, a nickel foil, a stainless steel foil, a titanium foil, a nickel foam, a copper foam, a polymer substrate coated with a conductive metal, and a combination thereof.

The negative electrode may be prepared by coating a first negative electrode active material composition and drying it to prepare a first negative electrode active material layer, coating a second negative electrode active material composition on the first negative electrode active material layer and drying the resultant, and compressing the dried product.

The first negative electrode active material layer composition and the second negative electrode active material layer composition may be in the form of a slurry, and the solvents in each composition may be the same or different. The solvent may be N-methyl pyrrolidone or water, and when the binder used in the first negative electrode active material layer and the second negative electrode active material layer, the solvent may be water.

One embodiment provides a lithium secondary battery including the negative electrode, a positive electrode, and an electrolyte.

The positive electrode includes a current collector and a positive electrode active material layer disposed on the current collector and including a positive electrode active material.

The positive electrode active material may include a compound (lithiated intercalation compound) capable of intercalating and deintercalating lithium. Specifically at least one composite oxide of lithium and a metal of cobalt, manganese, nickel, and a combination thereof may be used. Specific examples thereof may be a compound represented by one of the following chemical formulae. $Li_aA_{1-b}X_bD_2$ ($0.90 \le a \le 1.8$, $0 \le b \le 0.5$); $Li_aA_{1-b}XbO_{2-c}D_c$ ($0.90 \le a \le 1.8$, $0 \le b \le 0.5$, $0 \le c \le 0.05$); $Li_aE_{1-b}XbO_{2-c}D_c$ ($0 \le b \le 0.5$, $0 \le c \le 0.05$); $Li_aE_{2-b}XbO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$)

In the chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

The compound may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive electrode active material by using these elements in the compound, and for example, the method may include any coating method (e.g., spray coating, dipping, etc.), but is not illustrated in more detail since it is well-known to those skilled in the related field.

In the positive electrode, an amount of the positive electrode active material may be about 90 wt % to about 98 wt % based on a total amount of the positive electrode active material layer.

According to one embodiment, the positive electrode active material layer may further include a binder and a conductive material. Herein, the amounts of the binder and the conductive material may be respectively 1 wt % to 5 wt % based on the total of the positive electrode active material layer.

The binder improves binding properties of positive electrode active material particles with one another and with a current collector. The exemplary binder may be polyvinyl alcohol, carboxymethyl cellulose, hydroxypropyl cellulose, diacetyl cellulose, polyvinyl chloride, carboxylated polyvinyl chloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. Furthermore, the ketone-based solvent includes cyclohexanone and the like. In addition, the alcohol-based solvent includes ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used alone or in a mixture, and when the organic solvent is used in a mixture, the mixture ratio may be controlled in accordance with a desirable battery performance, which may be well-known to one of ordinary skill in the related art.

Furthermore, the carbonate-based solvent is prepared by mixing a cyclic carbonate and a linear carbonate. When the cyclic carbonate and linear carbonate are mixed together in a volume ratio of 1:1 to 1:9, performance of an electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

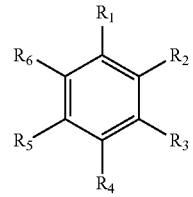

[Chemical Formula 1]

In Chemical Formula 1, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte of a lithium secondary battery may further include vinylene carbonate or an ethylene carbonate-based compound represented by Chemical Formula 2 as an additive for improving the cycle-life.

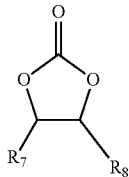

[Chemical Formula 2]

In Chemical Formula 2, $R_7$ and $R_8$ are independently hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When such the additive for improving the cycle-life is further used, the amount may be controlled within an appropriate range.

The electrolyte may further include vinyl ethylene carbonate, propane sultone, succinonitrile, or a combination thereof, and the amount thereof may be suitably controlled.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer ranging from 1 to 20), LiCl, LiI, and $LiB(C_2O_4)_2$ (lithium bis(oxalato) borate: LiBOB). A concentration of the lithium salt may range from about 0.1 M to about 2.0 M. When the lithium salt is included at the above concentration range, an electrolyte may have improved performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
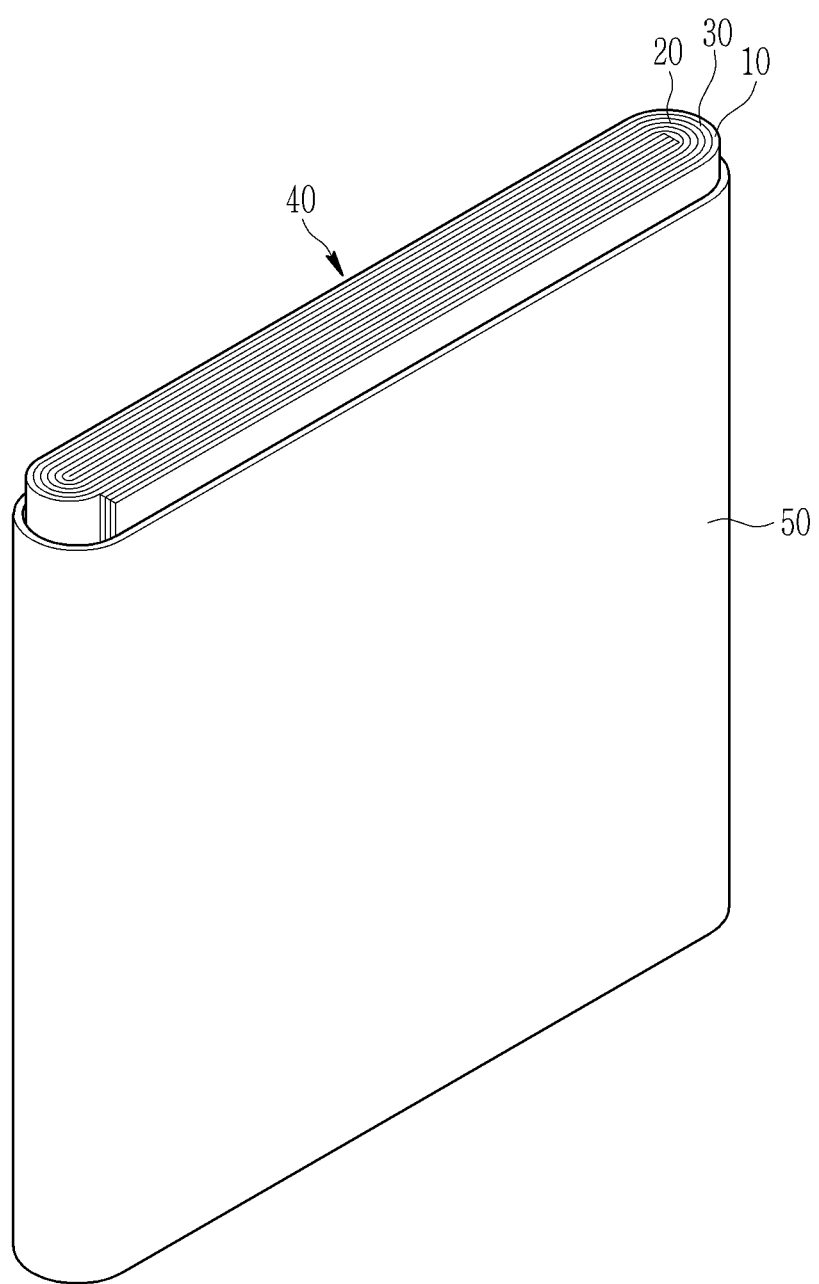
FIG. 2 is a drawing schematically showing a structure of a lithium secondary battery according to one embodiment of the present invention.

FIG. 2 is an exploded perspective view of a rechargeable lithium battery according to one embodiment. The rechargeable lithium battery according to an embodiment is illustrated as a prismatic battery, but is not limited thereto, and may include variously-shaped batteries such as a cylindrical battery, a pouch battery, and the like.

Referring to FIG. 2, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte (not shown) may be impregnated in the positive electrode 10, the negative electrode 20, and the separator 30.

EXAMPLES

Hereinafter, examples of the present invention and comparative examples are described. These examples, however, are not in any sense to be interpreted as limiting the scope of the invention.

Measurement of Pellet Density

The pellet density of artificial graphite used in the following test was the value of the powder pellet density which was measured by adding the artificial graphite to a mold and maintaining it under a pressure of 2.0 tons for 20 seconds.

Comparative Example 1

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 97:1.5:1.5 wt % to prepare a negative electrode active material slurry.

The negative electrode active material slurry was coated on a Cu current collector, dried, and then compressed to prepare a negative electrode on which a negative electrode active material layer with a loading level of 15 mg/cm² and an active mass density of 1.6 g/cc was formed.

Comparative Example 2

A artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 97:1.5:1.5 wt % to prepare a first negative electrode active material slurry.

An artificial graphite negative electrode active material (active material A) with an average particle diameter (D50) of 18.5 μm and a pellet density (powder pellet density) of 1.78 g/cc, a carboxymethyl cellulose thickener and a styrene butadiene rubber binder were mixed in deionized water at a weight ratio of 97:1.5:1.5 wt % to prepare a second negative electrode active material slurry.

The first negative electrode active material slurry was coated on a Cu current collector and dried to prepare a first negative electrode active material layer with a loading level of 7.5 mg/cm². The second negative electrode active material composition was coated on the first negative electrode active material layer and dried to prepare a second negative electrode active material layer with a loading level of 7.5 mg/cm².

Thereafter, the current collector on which the first and second electrode negative electrode active material layers were formed was compressed to prepare a negative electrode with an active mass density of 1.60 g/cc. In the resulting negative electrode, the ratio of the loading level of the first active material layer and the loading level of the second active material layer was 1:1.

Comparative Example 3

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 98.5:0.75:0.75 wt % to prepare a negative electrode active material slurry.

The negative electrode active material slurry was coated on a Cu current collector, dried and then compressed to prepare a negative electrode on which a negative electrode active material layer with a loading level of 15 mg/cm² and an active mass density of 1.6 g/cc was formed.

Example 1

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 97:1.5:1.5 wt % to prepare a first electrode negative electrode active material slurry.

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 98.5:0.75:0.75 wt % to prepare a second electrode negative electrode active material slurry.

The first negative electrode active material slurry was coated on a Cu current collector and dried to prepare a first negative electrode active material layer with a loading level of 7.5 mg/cm². The second negative electrode active material composition was coated on the first negative electrode active material layer and dried to prepare a second negative electrode active material layer with a loading level of 7.5 mg/cm².

Thereafter, the current collector on which the first and second negative electrode active material layers were formed was compressed to prepare a negative electrode with an active mass density of 1.60 g/cc. In the resulting negative electrode, the ratio of the loading level of the first active material layer and the loading level of the second active material layer was 1:1.

Example 2

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 97:1.5:1.5 wt % to prepare a first negative electrode active material slurry.

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 98.8:0.65:0.55 wt % to prepare a second negative electrode active material slurry.

The first negative electrode active material slurry was coated on a Cu current collector and dried to prepare a first negative electrode active material layer with a loading level of 7.5 mg/cm². The second negative electrode active material composition was coated on the first negative electrode active material layer and dried to prepare a second negative electrode active material layer with a loading level of 7.5 mg/cm².

Thereafter, the current collector on which the first and second negative electrode active material layers were formed was compressed to prepare a negative electrode with an active mass density of 1.60 g/cc. In the resulting negative electrode, the ratio of the loading level of the first active material layer and the loading level of the second active material layer was 1:1.

Example 3

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in an deionized water at a weight ratio of 97:1.5:1.5 wt % to prepare a first negative electrode active material slurry.

An artificial graphite negative electrode active material (active material B) with an average particle diameter (D50) of 12.0 μm and a pellet density (powder pellet density) of 1.45 g/cc, a carboxymethyl cellulose thickener, and a styrene butadiene rubber binder were mixed in deionized water at a weight ratio of 98.8:0.65:0.55 wt % to prepare a second negative electrode active material slurry.

The first negative electrode active material slurry was coated on a Cu current collector and dried to prepare a first negative electrode active material layer with a loading level of 7.5 mg/cm². The second negative electrode active material composition was coated on the first negative electrode active material layer and dried to prepare a second negative electrode active material layer with a loading level of 7.5 mg/cm².

Thereafter, the current collector on which the first and second negative electrode active material layers were formed was compressed to prepare a negative electrode with an active mass density of 1.60 g/cc. In the resulting negative electrode, the ratio of the loading level of the first active material layer and the loading level of the second active material layer was 1:1.

Measurement of Peel Strength of Electrode

The peel strength of the negative electrodes according to Examples 1 to 3 and Comparative Example 1 to 3 was measured and the results are shown in Table 1.

The peel strength measurement was that an adhesive tape (available from Nichiban Co., Ltd., Celotape, trademark No. 405) with a width of 1.5 cm was adhered on a negative electrode fixed on stainless steel.

And, the peel strength was measured under a 180° peeling test using a peeling tester (available from Shimadzu Corporation, SHIMAZU EZ-S).

Furthermore, the amounts of the binder included in the second negative electrode active material layer and the first negative electrode active material layer were calculated by converting the amount of the active material included in each of active materials, the weight ratio of the second binder/the first binder was obtained, and the results are also shown in Table 1.

TABLE 1

| | Composition Upper layer (second negative electrode active material layer) | Lower layer (first negative electrode active material layer) | Ratio of content of second binder/content of first binder | Peel strength (N/m) |
|---|---|---|---|---|
| Comparative Example 1 | Active material A:CMC:SBR = 97:1.5:1.5 | | — | 2.90 |
| Comparative Example 2 | Active material A:CMC:SBR = 97:1.5:1.5 | Active material A:CMC:SBR = 97:1.5:1.5 | 1 | 3.75 |
| Comparative Example 3 | Active material A:CMC:SBR = 98.5:0.75:0.75 | | — | 1.21 |
| Example 1 | Active material A:CMC:SBR = 98.5:0.75:0.75 | Active material A:CMC:SBR = 97:1.5:1.5 | 0.49 | 2.86 |
| Example 2 | Active material A:CMC:SBR = 98.8:0.65:0.55 | Active material A:CMC:SBR = 97:1.5:1.5 | 0.36 | 2.44 |
| Example 3 | Active material B:CMC:SBR = 98.8:0.65:0.55 | Active material A:CMC:SBR = 97:1.5:1.5 | 0.36 | 1.56 |

In Table 1, CMC refers to carboxymethyl cellulose and SBR refers to styrene-butadiene rubber. As shown in Table 1, the peel strength of Examples 1 to 3 is very much higher than that of Comparative Example 3, and it resultantly exhibited good adherence. Furthermore, although the total contents of the binder included in the first and second negative electrode active materials according to Examples 1 to 2 were lower than those of the binder of Comparative Examples 1 and 2, the peel strength of Examples 1 and 2 are similar to that of Comparative Examples 1 and 2, so that it can be shown that, regardless of decreasing the amount of binder, similar adhesion is exhibited.

Evaluation of Cycle-Life Characteristic

Lithium secondary cells were fabricated by using the negative electrodes according to Examples 2 and 3 and Comparative Examples 1 to 3, a positive electrode, and an electrolyte.

As the positive electrode, one prepared by dissolving a LiCoO$_2$ positive electrode active material, a carbon black conductive material, and a polyvinylidene fluoride binder at a weight ratio of 97:1:2 in N-methyl pyrrolidone to prepare a positive electrode active material slurry, coating it on an aluminum current collector, drying, and compressing was used. As the electrolyte, a mixed non-aqueous organic solvent of ethylene carbonate, propylene carbonate, and ethylene propionate (2:1:7 volume ratio) in which 1.0 M LiPF$_6$ was dissolved, was used.

The fabricated cell was charged and discharged at 1.0 C charging and 1.0 C discharge condition 100 times. A capacity ratio (capacity retention) of the discharge capacity at each cycle to the discharge capacity at $1^{st}$ charge and discharge were measured and the results are shown in FIG. 3.

Figure 3:
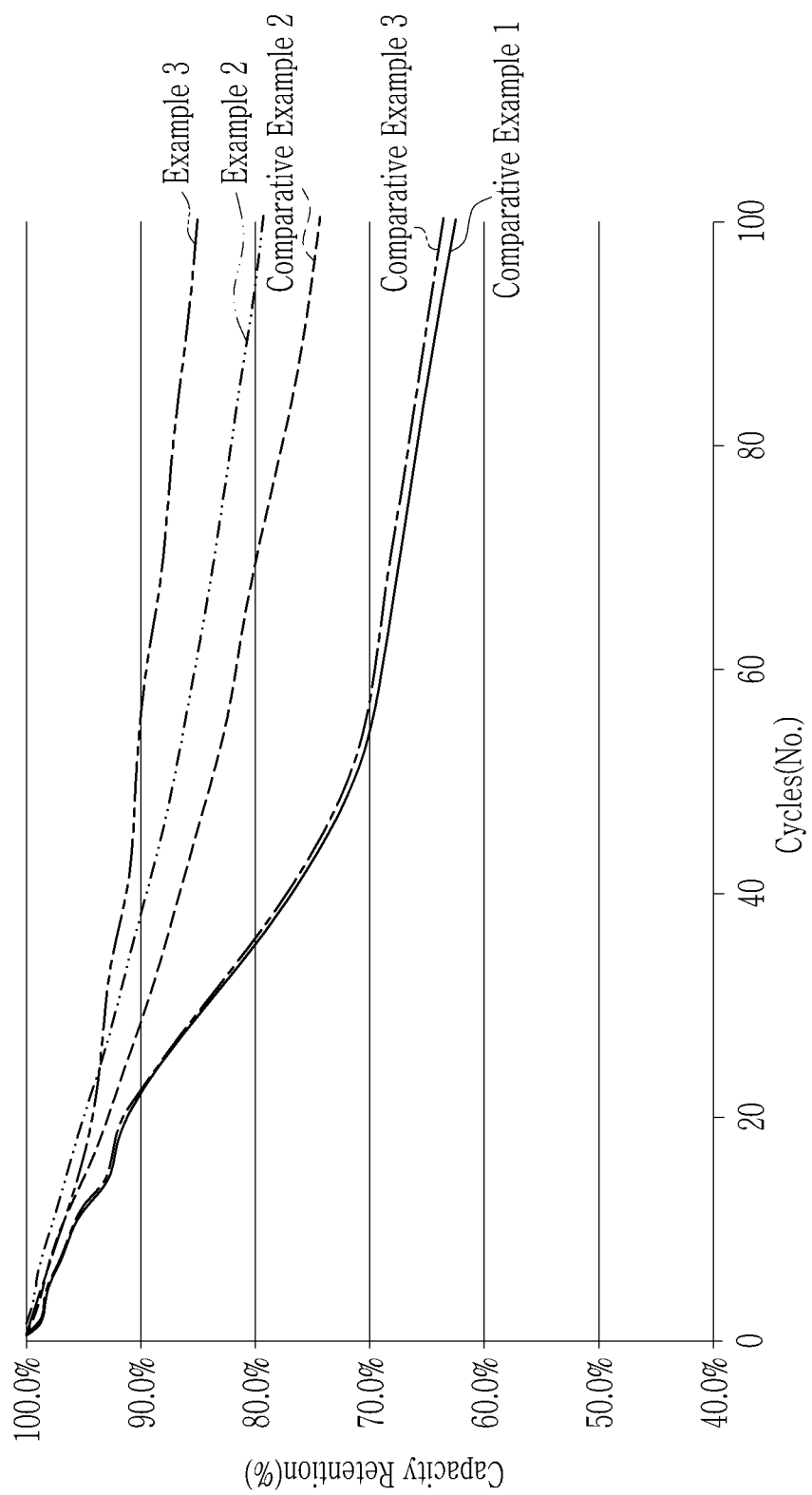
FIG. 3 is a graph showing the cycle-life characteristics of half-cells using the negative electrodes according to Examples 2 and 3 and Comparative Examples 1 to 3.

As shown in FIG. 3, the capacity retention, that is, cycle-life characteristics, of Examples 2 and 3 exhibited better than those of Comparative Examples 1 to 3.

The reason Examples 2 and 3 exhibited better capacity retention is considered to be an effect from increased ionic conductivity by using the smaller content of the binder in the second negative electrode active material than that of the binder in the negative electrode active material. Furthermore, as shown in Table 1, Examples 2 and 3 exhibited good peel strength, that is, good adhesion. Whereas Comparative Examples 1 and 2 exhibited good adherence, but had a deteriorated cycle-life characteristic, so that it is difficult to practically use it.

Furthermore, Example 3 in which a negative electrode active material having a smaller average particle diameter (D50) and lower pellet density than the first negative electrode layer was used, the second negative electrode active material layer being an upper layer, exhibited the best cycle-life characteristics.

Example 4

An artificial graphite negative electrode active material (active material A) with an average particle diameter (D50) of 18.5 μm and a pellet density (powder pellet density) of 1.78 g/cc, a carboxymethyl cellulose thickener and a styrene butadiene rubber binder were mixed in deionized water at a weight ratio of 97:1.5:1.5 wt % to prepare a negative electrode active material slurry.

An artificial graphite negative electrode active material (active material A) with an average particle diameter (D50) of 12.0 μm and a pellet density (powder pellet density) of 1.45 g/cc, a carboxymethyl cellulose thickener and a styrene butadiene rubber binder were mixed in deionized water at a weight ratio of 98.8:0.65:0.55 wt % to prepare a negative electrode active material slurry.

5 wt % of a carbon black conductive material, 1 wt % of carboxymethyl cellulose, and 94 wt % of a deionized water solvent were mixed to prepare a conductive layer slurry.

The first negative electrode active material slurry was coated on a Cu current collector and dried to prepare a first negative electrode active material layer with a loading level of 7.5 mg/cm$^2$. The conductive slurry was coated on the first negative electrode active material layer and dried to prepare a conductive layer with a thickness of 1.0 μm.

The second negative electrode active material composition was coated on the conductive layer and dried to prepare a second negative electrode active material layer with a loading level of 7.5 mg/cm$^2$.

Thereafter, the current collector on which the first negative electrode active material layer, the conductive layer, and the second negative electrode active material layer were formed was compressed to prepare a negative electrode with an active mass density of 1.60 g/cc. In the resulting negative electrode, the ratio of the loading level of the first active material layer and the loading level of the second active material layer was 1:1.

Example 5

An artificial graphite negative electrode active material (active material A) with an average particle diameter (D50) of 18.5 μm and a pellet density (powder pellet density) of 1.78 g/cc, a carboxymethyl cellulose thickener, and a styrene butadiene rubber binder were mixed in deionized water at a weight ratio of 97:1.5:1.5 wt % to prepare a first negative electrode active material slurry.

An artificial graphite negative electrode active material (active material B) with an average particle diameter (D50) of 12.0 μm and a pellet density (powder pellet density) of 1.45 g/cc, a carboxymethyl cellulose thickener, and a styrene butadiene rubber binder were mixed in deionized water at a weight ratio of 98.5:0.75:0.75 wt % to prepare a second negative electrode active material slurry.

25 wt % of an artificial graphite negative electrode active material (active material A) with an average particle diameter (D50) of 18.5 μm and a pellet density (powder pellet density) of 1.78 g/cc, 5 wt % of a carbon black conductive material, 1 wt % of carboxymethyl cellulose, and 69 wt % of a deionized water solvent were mixed to prepare a conductive layer composition.

The first negative electrode active material slurry was coated on a Cu current collector and dried to prepare a first negative electrode active material layer with a loading level of 7.5 mg/cm$^2$. The conductive layer slurry was coated on the first negative electrode active material layer and dried to prepare a conductive layer with a thickness of 10 μm.

The second negative electrode active material composition was coated on the conductive layer and dried to prepare a second negative electrode active material layer with a loading level of 7.5 mg/cm$^2$.

Thereafter, the current collector on which the first negative electrode active material layer, the conductive layer, and the second negative electrode active material layers were formed was compressed to prepare a negative electrode with an active mass density of 1.60 g/cc. In the resulting negative electrode, the ratio of the loading level of the first active material layer and the loading level of the second active material layer was 1:1.

Evaluation of Cycle-Life Characteristic

Lithium secondary cells were fabricated by using the negative electrodes according to Examples 3 to 5 and Comparative Examples 1 to 3, a positive electrode, and an electrolyte.

As the positive electrode, one prepared by dissolving a LiCoO$_2$ positive electrode active material, a carbon black conductive material, and a polyvinylidene fluoride binder at a weight ratio of 97:1:2 in N-methyl pyrrolidone to prepare a positive electrode active material slurry, coating it on an aluminum current collector, drying, and compressing was used. As the electrolyte, a mixed non-aqueous organic solvent of ethylene carbonate, propylene carbonate, and ethylene propionate (2:1:7 volume ratio) in which 1.0 M LiPF$_6$ was dissolved, was used.

The fabricated cell was charged and discharged at a 1.0 C charging and 1.0 C discharge condition 100 times. A capacity ratio (capacity retention) of the discharge capacity at each cycle to the discharge capacity at $1^{st}$ charge and discharge were measured and the results are shown in FIG. 4.

Figure 4:
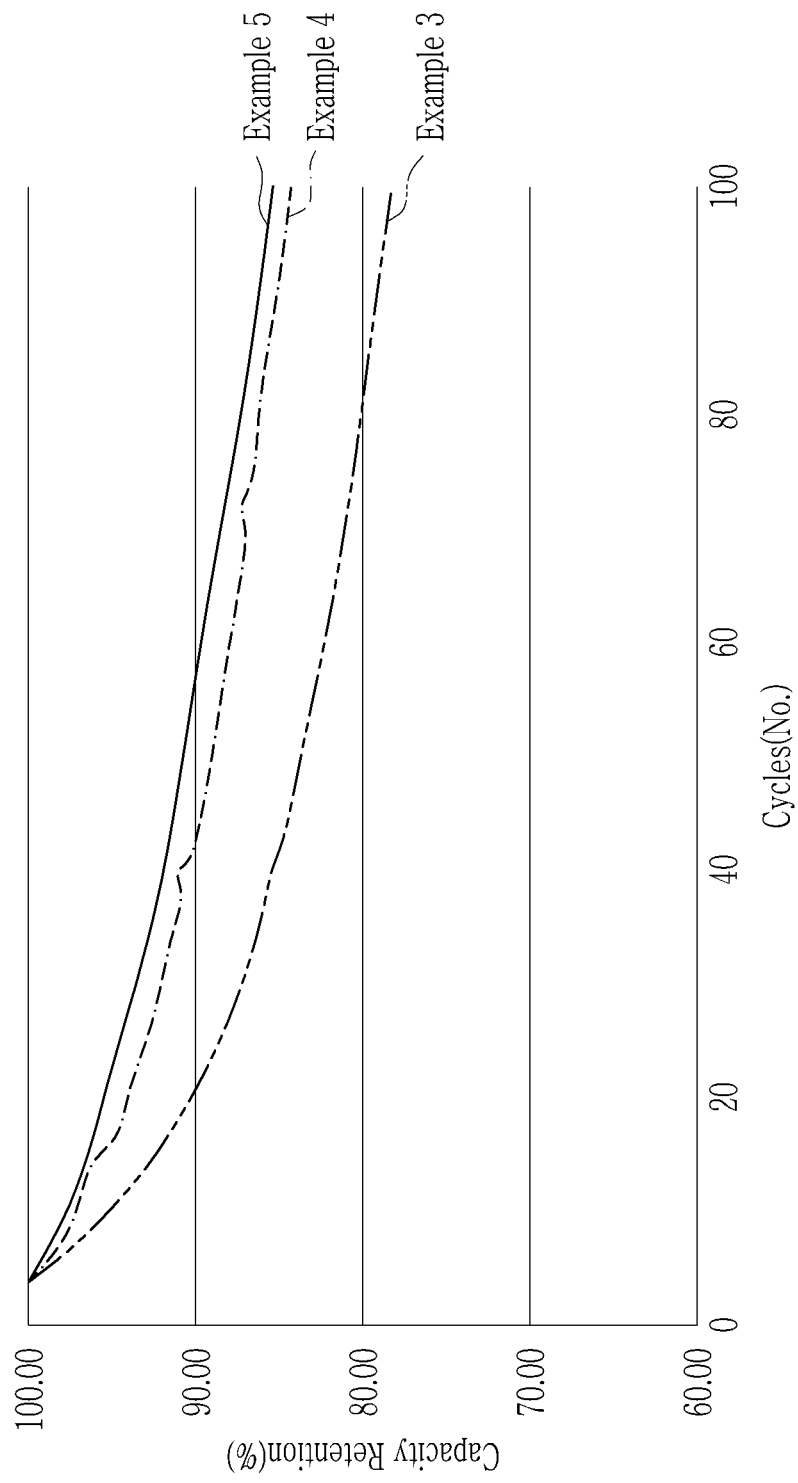
FIG. 4 is a graph showing the cycle-life characteristics of the half-cells using the negative electrodes according to Examples 3 to 5.

As shown in FIG. 4, the capacity retention, that is, cycle-life characteristics, of Examples 4 and 5 exhibited better than that of Example 3.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode for a lithium secondary battery comprising:
    a current collector; and
    a negative electrode active material layer on the current collector,
    wherein the negative electrode active material layer comprises a first active material layer including a first active material and a first binder, and
    a second active material layer on the first active material layer and including a second active material and a second binder,
    wherein a content of the first binder is greater than a content of the second binder, and
    wherein a ratio of an average particle diameter of the first active material to an average particle diameter of the second active material is more than 1 and 4 or less.

2. The negative electrode for the lithium secondary battery of claim 1, wherein the content of the first binder is 1 wt % to 10 wt % based on a total weight of the first active material layer.

3. The negative electrode for the lithium secondary battery of claim 1, wherein the content of the second binder is 0.5 wt % to 10 wt % based on a total weight of the second active material layer.

4. The negative electrode for the lithium secondary battery of claim 1,
    wherein a ratio of the content of the second binder to the content of the first binder is more than 0 and less than 1.

5. The negative electrode for the lithium secondary battery of claim 1,
    wherein a ratio of a loading level of the first active material layer to a loading level of the second active material layer is 1:1 to 1:7.

6. The negative electrode for the lithium secondary battery of claim 1, wherein at least one of the first active material layer and the second active material layer further includes a conductive material.

7. The negative electrode for the lithium secondary battery of claim 1, wherein a conductive layer is further included between the first active material layer and the second active material layer.

8. The negative electrode for the lithium secondary battery of claim 1, wherein the first binder and the second binder are respectively non-aqueous binders or aqueous binders.

9. The negative electrode for the lithium secondary battery of claim 1, wherein at least one of the first binder and the second binder is an aqueous binder.

10. The negative electrode for the lithium secondary battery of claim 1, wherein a pellet density of each of the first active material of the first active material layer and the second active material of the second active material layer is 1.1 g/cc to 2.0 g/cc.

11. The negative electrode for the lithium secondary battery of claim 1, wherein a pellet density of the second active material of the second active material layer is smaller than a pellet density of the first active material of the first active material layer by 0.01 g/cc to 0.5 g/cc.

12. A lithium secondary battery comprising:
    a negative electrode;
    a positive electrode; and
    an electrolyte,
    wherein the negative electrode is of claim 1.

* * * * *